United States Patent [19]
Antonevich

[11] 3,991,933
[45] Nov. 16, 1976

[54] METHODS AND APPARATUS FOR SOLDERING

[75] Inventor: John N. Antonevich, Jamestown, N.Y.

[73] Assignee: Blackstone Corporation, Jamestown, N.Y.

[22] Filed: Sept. 8, 1975

[21] Appl. No.: 611,190

[52] U.S. Cl. ............................... 228/110; 228/1; 228/262
[51] Int. Cl.² .............................. B23K 1/06
[58] Field of Search .............. 228/1, 19, 36, 37, 40, 228/110, 111, 125, 180, 258, 262, 259, 260

[56] References Cited
UNITED STATES PATENTS
3,760,481 9/1973 Greever .......................... 228/1 X Primary Examiner—Harold D. Whitehead
Assistant Examiner—Margaret Joyce
Attorney, Agent, or Firm—Buell, Blenko & Ziesenheim

[57] ABSTRACT

A method and apparatus for fluxless soldering, particularly of capillary joints, is provided wherein the part to be soldered is immersed in a bath of molten solder, the solder is caused to cavitate and simultaneously the part itself is set into a sympathetic mode of vibration by means of low frequency amplitude modulated variations or harmonics and sub-harmonic variations imposed on the bath.

8 Claims, 3 Drawing Figures

METHODS AND APPARATUS FOR SOLDERING

This application is a modification of my co-pending application Ser. No. 611,202, filed 9/8/75.

This invention relates to methods and apparatus for soldering and particularly to a method and apparatus for soldering capillary joints using a combination of simultaneously applied ultrasonic and vibrational energy induced in the part by low amplitude modulated variations or harmonic and sub-harmonic variations on the ultrasonic energy. The use of ultrasonic energy in molten solder baths to generate cavitation implosions to remove oxide layers from a surface to produce a clean surface for wetting is well known. Considerable amounts of energy are required to agitate molten metals to the threshold of cavitation. Using water as a reference, with a specific energy requirement of 1 for the onset of cavitation, it is determined that molten zinc solders have a specific energy requirement of roughly 2, molten lead 10 and tin 20. Because of the extreme energy requirements for cavitating lead and tin solders effective large ultrasonic solder baths have been difficult to develop. Generally when cavitation occurs in molten solder pots at pressure antinodes of the sound field severe attenuation and/or reflection of energy occurs due to the cavitating cloud, resulting in the collapse of the sound field and unloading, with cavitation occurring adjacent the source of ultrasonic or sonic energy input. With non uniform cavitation distribution in the solder bath erratic soldering quality results. In the case of zinc solder where the energy requirements for cavitation are near that of water, the solder bath of zinc alloys is equivalent in design and behavior to conventional ultrasonic cleaner designs. Preheated sheets of aluminum dipped into an ultrasonic solder bath will be coated within a fraction of a second. However, aluminum capillary joints immersed in conventional solder baths of zinc solders either require meticulous degreasing, excessive preheating, or increased ultrasonic energy levels to fill and alloy with solder. Recourse to focused or high intensity low frequency ultrasonic fields has been reasonably successful in generating ample radiation pressures to force fill capillary joints and cavitation to act on the surfaces to be wetted. The use of high intensity ultrasonic fields to generate sufficient radiation pressure to force molten metal into capillary joints, usually result in excessive localized alloying or dissolution of base metal immersed into the solder, or excessive time for the solder to incrementally wet and flow into the capillary to produce a complete joint. A typical application for fluxless ultrasonic soldering is the joining of return bends to bells of aluminum air conditioning coils. The difficulty of producing a uniform high intensity sound field over a large area and particularly in a focused field results in non uniform joining of return bend and tube arrays. As a result, soldering of large assemblies has been non uniform and generally unsatisfactory.

This invention provides a method which reduces ultrasonic energy requirements to accomplish consistent and uniform fluxless soldering or coating of assemblies or parts with molten metals.

Another objective of this invention is to reduce or eliminate the incidence of resonant vaporous or gaseous cavities from aggregating on surfaces being soldered which cause high velocity microstreaming of solder surfaces resulting in localized pitting through rapid dissolution or erosion of the surface.

The objectives of this invention are achieved by inducing vibration of the part being soldered by imposing upon the solder bath low frequency amplitude modulated variations or harmonic and sub-harmonic variations of the ultrasonic energy being used to cavitate the molten solder in the solder pot. This accomplishes several purposes. It materially reduces the energy necessary to provide full solder coating while creating a more effective and full capillary action beyond that attainable with any present method. It reduces the danger of excessive pitting or destruction of the part by fusion because of the reduced time necessary to cause effective soldering.

Aluminum air conditioner coils, for example, using this invention can be made in about half the time conventionally used using 50 and 90 percent less power in conventional plane standing wave and focused field solder pots respectively. With this invention, copper sheets and wires can also be coated in less time and with no tendency to form unwetted areas due to attached gas bubbles.

Experimental data indicates that the contact angle between solder and a surface is modified more effectively by accelerations due to vibratory movement of surfaces relative to the solder than by ultrasonic pressure variations in the solder. The changing contact angle appears to have a hysteresis effect with regard to the apparent surface tension force between the solder and the non wetted surface it contacts tending to reduce in magnitude approaching a zero value depending upon time and amplitude of disturbance. Wetting of surfaces due to micro shock waves generated by imploding cavitation sites in combination with the gross disturbance results in a hysteresis wet and flow process in capillary type joint soldering, resulting in a very rapid approach to a condition of zero surface tension or an equilibrium tension, if energy of disturbance is lower than the surface energies interacting. Choosing the low frequency of vibration to cause parts to resonate would be ideal, however, any form of vibration of parts are found adequate for complete filling of the joint.

This unique synergistic effect virtually eliminates the problems which have been commonly associated with soldering capillary joints, particularly in the aluminum field while materially reducing both the time and the energy input necessary to produce a joint.

In the foregoing general outline of my invention, I have set out certain objects, purposes and advantages of my invention. Other objects, purposes and advantages of my invention will be apparent from a consideration of the following description and the accompanying drawings in which.

Figure 2:
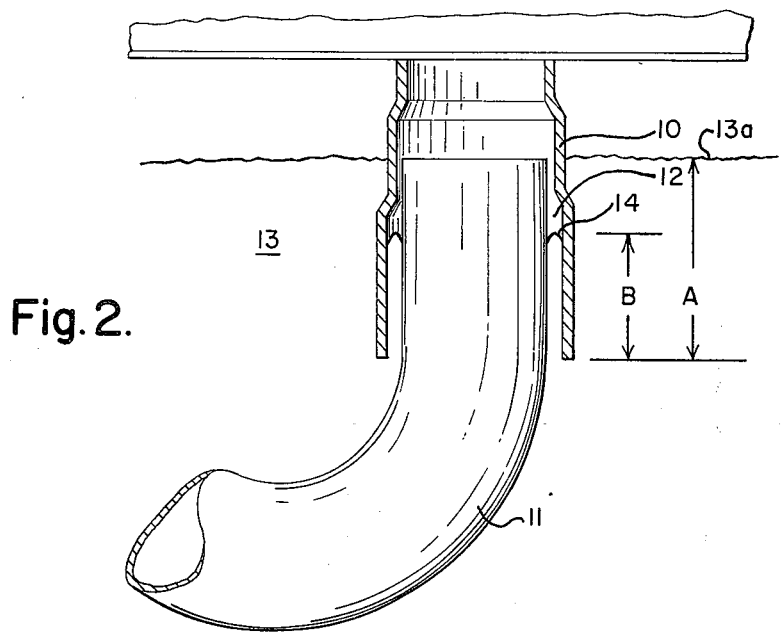
FIG. 2 is a fragmentary section of a solder joint showing the level of immersion as compared to length of joint.

Referring to the drawings I have illustrated in FIG. 2, a typical relationship of expanded tube end 10 and return bend 11 which must be soldered in forming an air conditioner coil. The return bend 11 is mechanically driven into the expanded end of tube 10, leaving a capillary area 12 between them. The joint is immersed in a bath of solder 13 having a surface level 13a and the solder rises in the capillary to a certain level 14 depending upon the conditions. In this figure, I have identified depth of immersion with the letter A and length of solder joint (joint penetration) with the letter B.

Figure 1:
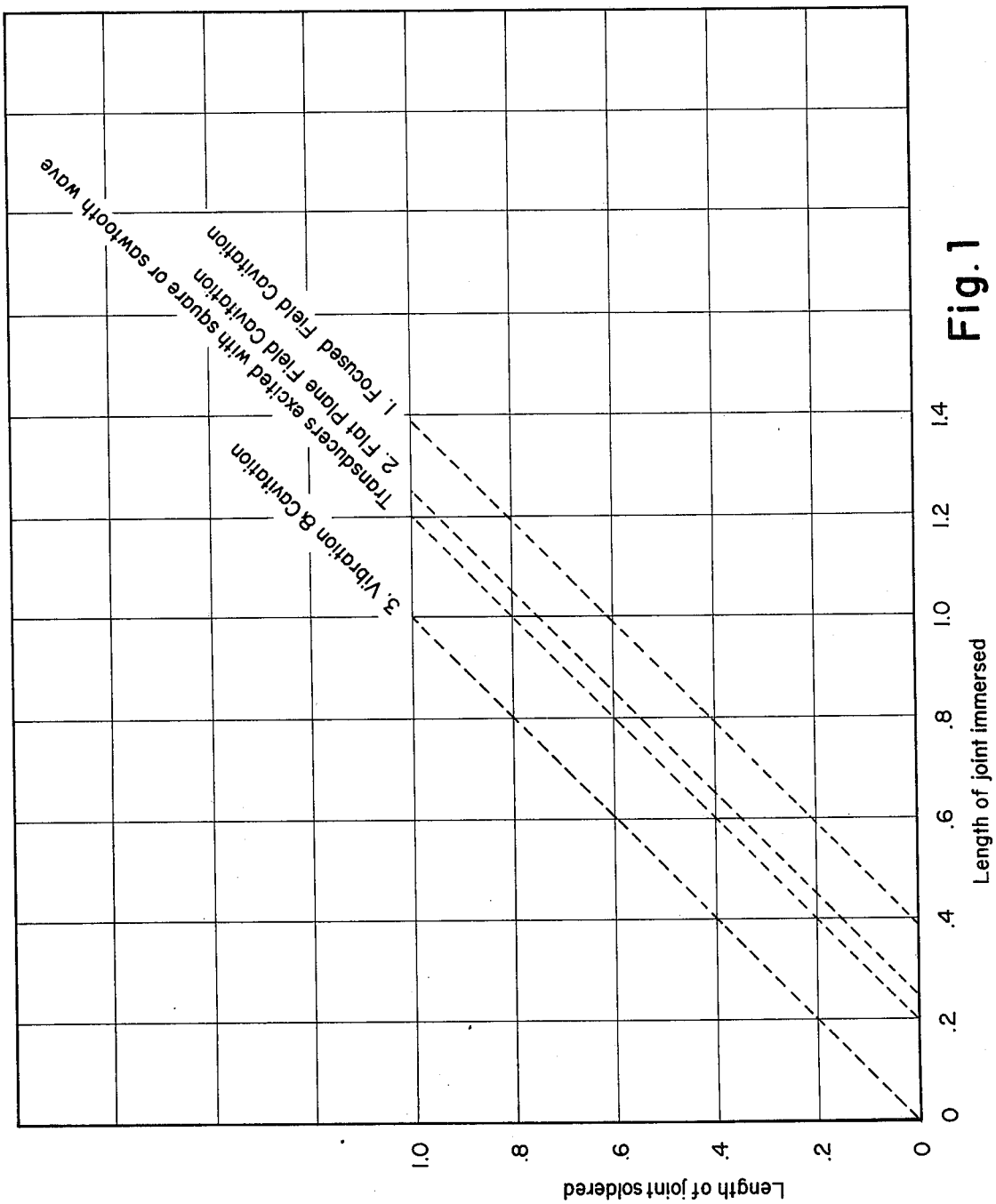
FIG. 1 is a graph showing the relationship between soldered length of a capillary joint and depth of joint immersion under various conditions.

FIG. 1 shows the relationships obtained between joint penetration and depth of joint immersion into zn/al solder. The joints were aluminum return bends in bells of an aluminum air condition coil with a 0.035 inch gap between bend and bell. Similar results were obtained for copper capillary joints in lead tin solder.

In FIG. 1, curve 1 shows the relationship between alloyed or soldered length of a capillary joint and depth of joint immersion into solder ultrasonically activated in a focused ultrasonic field; Curve 2 is obtained for joints made in a plane standing wave ultrasonic field; Curve 3 is the limit obtained when vibrations are coupled to the joint while immersed in an ultrasonically activated solder bath according to this invention. The curves show that for a given condition of vibratory energy input the distance between the free solder level and solder alloy line in the capillary is constant and equal to the intercept of the curve with the immersion depth axis. Controlling the amplitude of vibratory forces coupled to capillary joints effectively controls the depth to which solder flows and alloys in a given joint when immersed in a cavitating bath of molten solder. It is found that vibratory or impact forces coupled to immersed joints prior to and not during the onset of cavitation will not contribute appreciably to the production of quality capillary joints or improve the solder coating of parts.

Figure 3:
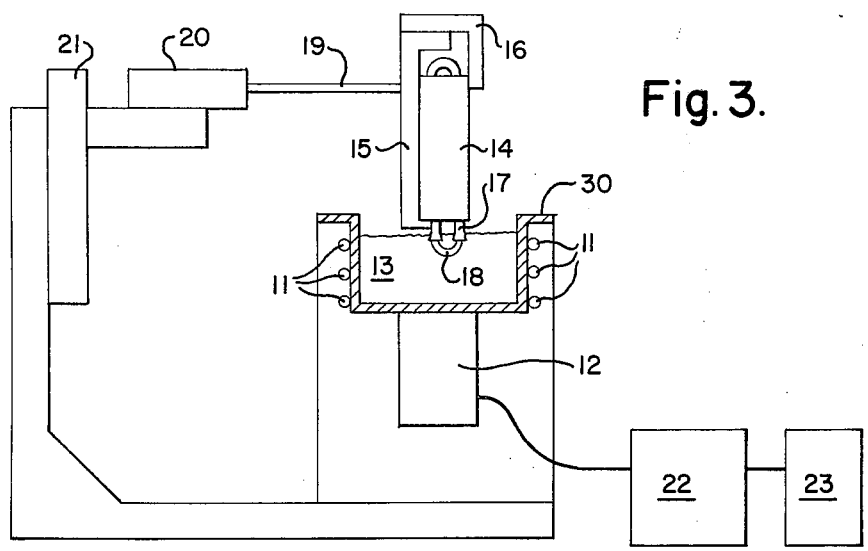
FIG. 3 is a side elevational view partly in section of an apparatus for practicing this invention.

In the apparatus shown in FIG. 3, I have illustrated an embodiment of apparatus for carrying out this invention. In this apparatus I provide a solder pot 30 surrounded by heaters 11 and provided with transducers 12 on the bottom designed to cavitate molten solder 13 in pot 30. An air conditioner coil 14 is held on support frame 15 by clamp 16 with the expanded tube ends 17 and return bend 18 beneath the surface of the molten solder. The support frame 15 is mounted on a cantilever arm 19 provided with horizontal drive means 20 and vertical drive means 21. The cantilever arm is an elastic or spring arm which permits relative freedom of movement of support 15 and coil 14. An electronic amplifier 22 connects a square wave, sawtooth or amplitude modulated oscillator 23 to transducer 12.

In operation the tube end 17 and return bend 18 are mechanically driven together, the coil 14 is mounted on support 15 by clamp 16, the vertical 21 and horizontal 20 drive means are energized to move the coil 14 over solder pot 10 and lower it until the tube ends 17 and return bend 18 are immersed in molten solder 13 and held there until they reach the temperature of the solder. The transducer 12 is energized to produce high frequency motion in the solder pot walls to cause the molten solder to cavitate. Simultaneously the oscillator 23 is energized to induce a low frequency amplitude modulated or a harmonic and sub-harmonic signal on the solder pot and consequently through the solder on the part being soldered to cause it to vibrate.

In short, the process of this invention is first to dip the part into the molten solder to preheat or preheat by any other means before dipping which will not extensively oxidize the part. After the part is dipped and dwells in the solder to level temperatures in the immersed portion of the part, the solder is caused to cavitate by ultrasonic pressure variations that are low frequency amplitude modulated or contain harmonics and subharmonics to set the part to be soldered into a sympathetic mode of vibration. This can be realized by mounting the part on an elastic frame for dipping, such as a cantilever or spring and driving the ultrasonic transducers of the solder pot with an amplitude modulated signal or signal rich in harmonics such as a square wave or triangular wave. The feature of this method is its simplicity as it requires no secondary source of vibrations. Control of solder flow alloying and extent of erosion is more difficult than mechanically vibrating the part as the degree of induced vibrations generated in the part is dependent on the amplitude and wave form of the ultrasonic pressure amplitudes. A distinct feature of this method of generating vibrations is that in general the solder pot itself will vibrate at other sympathetic frequencies as well as the fundamental driving frequency tending to generate a uniformly distributed cavitation field in the solder combining this method of exciting the solder pot with the method of direct excitation of the part to be soldered will provide control of solder penetration and uniformity of cavitation and solder wetting quality to a greater degree than any method known to me.

While I have illustrated and described presently preferred embodiments and practices of my invention in the foregoing specification, it will be understood that this invention may be otherwise embodied within the scope of the following claims.

I claim:
1. A method of soldering comprising the steps of:
   a. immersing a part to be soldered in a bath of molten solder,
   b. causing the molten solder to cavitate by subjecting the bath to an ultrasonic frequency,
   c. simultaneously subjecting the molten solder to at least one frequency, other than the frequency causing cavitation, which is resonant with the part to induce vibrations in said part, and
   d. removing said part from the molten solder.
2. A method of soldering as claimed in claim 1 wherein the molten solder is subjected to a low frequency amplitude modulated signal to induce vibrations in said part.
3. A method of soldering as claimed in claim 1 wherein the molten solder is subjected to harmonic and subharmonic signals to induce vibrations in said part.
4. Apparatus for soldering comprising a solder pot, a bath of molten solder in said pot, heater means acting on the pot to maintain the solder in a generally uniform molten condition, ultrasonic generator means acting on the solder pot and molten solder to induce cavitation therein and means acting on the solder pot and molten solder inducing in the molten solder at least one frequency, other than the frequency causing cavitation, which is resonant with the part to induce vibration in said part.
5. An apparatus as claimed in claim 4 wherein support means are provided adjacent the solder pot for elastically supporting said part at least partially immersed in the molten solder.
6. An apparatus as claimed in claim 4 wherein a low amplitude modulated oscillator is connected to said solder pot to induce a low amplitude modulated signal into the molten solder.
7. An apparatus as claimed in claim 4 wherein a sawtooth signal oscillator is connected to said solder pot to induce a sawtooth signal into the molten solder.
8. An apparatus as claimed in claim 4 wherein a square wave signal oscillator is connected to said solder pot to induce a square wave signal into the molten solder.

* * * * *